(12) United States Patent
Friedland et al.

(10) Patent No.: US 9,997,156 B2
(45) Date of Patent: Jun. 12, 2018

(54) METHOD OF FACILITATING CONSTRUCTION OF A VOICE DIALOG INTERFACE FOR AN ELECTRONIC SYSTEM

(71) Applicant: Audeme, LLC, Sunnyvale, CA (US)

(72) Inventors: Gerald Friedland, Alameda, CA (US); Bertrand Irissou, Sunnyvale, CA (US)

(73) Assignee: AUDEME, LLC, Sunnyvale, CA (US)

( * ) Notice: Subject to any disclaimer, the term of this patent is extended or adjusted under 35 U.S.C. 154(b) by 0 days. days.

(21) Appl. No.: 15/382,163

(22) Filed: Dec. 16, 2016

(65) Prior Publication Data

US 2017/0178624 A1 Jun. 22, 2017

Related U.S. Application Data

(60) Provisional application No. 62/268,500, filed on Dec. 17, 2015.

(51) Int. Cl.
| | | |
|---|---|---|
| *G10L 15/00* | (2013.01) | |
| *G10L 15/06* | (2013.01) | |
| *G10L 13/02* | (2013.01) | |
| *G10L 15/22* | (2006.01) | |
| *G10L 15/02* | (2006.01) | |
| *G10L 25/78* | (2013.01) | |

(52) U.S. Cl.
CPC ............ *G10L 15/063* (2013.01); *G10L 13/02* (2013.01); *G10L 15/02* (2013.01); *G10L 15/22* (2013.01); *G10L 25/78* (2013.01); *G10L 2015/025* (2013.01); *G10L 2015/0638* (2013.01); *G10L 2015/223* (2013.01)

(58) Field of Classification Search
CPC ....... G10L 15/063; G10L 15/02; G10L 15/22; G10L 13/02; G10L 25/78; G10L 15/025; G10L 15/223; G10L 2015/0638
USPC .......................... 704/231, 243, 246, 251, 275
See application file for complete search history.

(56) References Cited

U.S. PATENT DOCUMENTS

| | | | | |
|---|---|---|---|---|
| 2002/0077818 A1* | 6/2002 | Shieh | ...................... | G10L 13/04 704/258 |
| 2003/0191625 A1* | 10/2003 | Gorin | ..................... | G06F 17/278 704/1 |
| 2013/0324095 A1* | 12/2013 | Namm | ..................... | H04W 4/10 455/416 |

OTHER PUBLICATIONS

Sparkfun.com, EasyVR Shield 3.0—Voice Recognition Shield. Arduino.cc, Arduino.

(Continued)

*Primary Examiner* — Thierry L Pham

(57) ABSTRACT

Disclosed is a method of facilitating construction of a voice dialog interface for an electronic system. The method includes providing a library of programming interfaces configured to specify one or more of a call-sign and at least one command. Each of the call-sign and the at least one command may be specified in textual form. Additionally, the method includes training a speech recognizer based on one or more of the call-sign and the at least one command. Further, the method may include recognizing, using the speech recognizer, a speech input including a vocal representation of one or more of the call-sign and the at least one command. Additionally, the method includes performing at least one action associated with the at least one command based on recognizing the speech input. Further, the at least one action may include providing a verbal response using an integrated speech synthesizer.

12 Claims, 4 Drawing Sheets

(56) References Cited

OTHER PUBLICATIONS

Audeme.com/movi, MOVI—AUDEME.
Jasperproject.github.io, JASPER.
Bitsophia Technologia, BitVoicer 1.2 User Manual, 2013.
Wikipedia, Most Common Words in English.

* cited by examiner

METHOD OF FACILITATING CONSTRUCTION OF A VOICE DIALOG INTERFACE FOR AN ELECTRONIC SYSTEM

FIELD OF THE INVENTION

The present disclosure generally relates to the field of electronic devices. More specifically, the present disclosure relates to a method of facilitating construction of a voice dialog interface for an electronic system.

BACKGROUND

The recent rise of speech-driven digital personal assistants has shown the validity of speech recognition devices becoming part of our daily lives. However, programming and training speech recognizers, so far, has been the sole domain of the companies providing the speech recognizers. Part of the reason for this is that programming and training speech recognizers requires a speech recognition expert as the tasks involve, among others phonetization of sentences, training of acoustic models, training of language models, designing natural language processing filters to correct spelling and check the viability of sentences.

Currently, commercially available speech-based personal assistants do not allow for a configuration of the understood sentences or changing the call-sign. Further, some open-source speech-based personal assistants like Jasper (https://jasperproject.github.io/) allow to change the keywords spotted by the underlying speech recognizer by directly modifying the Python code of Jasper. However, Jasper does not support changing the call-sign, except through getting back to training the underlying speech recognizer. Additionally, Jasper does not allow for the recognition of full, temporally dependent sentences.

Further, state-of-the art speech recognizer libraries like Sphinx, Pocketsphinx, or KALDI come with default settings and APIs but require extensive knowledge to be programmed. For example, a user needs to understand how a language model works and how to phonetize sentences. Earlier, open-source libraries like micro speech, pre-dating Jasper, only allowed phoneme-level recognition based on very simple matching algorithms. However, such implementations could not be called personal assistants. Also, they don't have voice feedback.

As an example, hardware support allows EasyVR (https://www.sparkfun.com/products/13316) to extend the functionality to a selection of 36 built-in speaker independent commands (available in US English, Italian, Japanese, German, Spanish, and French) for basic controls. It supports up to 32-user-defined speaker dependent triggers by allowing the user to record their own waveform Therefore, an overall number of up to 336 additional commands may be added. However, EasyVR does not support a call-sign or temporally-dependent sentences. Programming is mostly performed through a serial interface command line. Further, EasyVR does not support voice feedback.

As another example, BitVoicer (http://www.bitsophia.com/Files/BitVoicer_v12_Manual_en.pdf) is a commercial speech recognition library that allows the training of both words as sentences. However, word dependencies and sentences need to be configured using a sophisticated graphical interface. BitVoicer does not support a call-sign. Among other things, BitVoicer needs to account for all possible slight variations in sentences and generate anagrams which makes the training process cumbersome because BitVoicer can only do a 'hard matching' of sentences. Further, BitVoicer does not support a call-sign or voice feedback.

In view of the foregoing, there is a need for improved methods and systems for facilitating construction of a voice dialog interface for electronic systems.

SUMMARY

Disclosed is a method of facilitating construction of a voice dialog interface for an electronic system. The method may include providing a library of programming interfaces for constructing the voice dialog interface. The library of programming interfaces may be configured to specify one or more of a call-sign and at least one command. Further, each of the call-sign and the at least one command may be specified in textual form. Additionally, the method may include training a speech recognizer based on one or more of the call-sign and the at least one command. Further, the method may include recognizing a speech input including a vocal representation of one or more of the call-sign and the at least one command. Furthermore, the recognition may be performed by using the speech recognizer. Additionally, the method may include performing at least one action associated with the at least one command based on recognizing the speech input. Further, the at least one action may include providing a verbal response using an integrated speech synthesizer.

Also disclosed is an electronic system configured for facilitating construction of a voice dialog interface. Accordingly, the electronic system may include a storage device configured to store a library of programming interfaces for constructing the voice dialog interface. The library of programming interfaces may be configured to specify one or more of a call-sign and at least one command. Further, each of the call-sign and the at least one command may be specified in textual form. Additionally, the electronic system may include a speech recognizer configured for training based on one or more of the call-sign and the at least one command. Further, the electronic system may include a microphone configured for receiving a speech input including a vocal representation of one or more of the call-sign and the at least one command. Furthermore, recognition of the speech input may be performed by using the speech recognizer. Additionally, the electronic system may include a speech synthesizer configured for providing a verbal response. Further, the electronic system may include a controller configured for performing at least one action associated with the at least one command based on recognizing the speech input. Furthermore, the at least one action may include the verbal response.

DETAILED DESCRIPTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention.

Disclosed is a method 100 of facilitating construction of a voice dialog interface for an electronic system. In some embodiments, the electronic system may include an electronic circuit development board. In some embodiments, the electronic development board may include a so-called Arduino-compatible circuit development board. In some embodiments, the electronic development board may include at least one physical interface configured to removably attach one or more of an input device, an output device and a processor to the electronic development board. In some embodiments, the at least one input device may include at least one sensor. Further, the at least one output device may include at least one actuator.

The method 100 may include a step 102 of providing a library of programming interfaces for constructing the voice dialog interface. Further, the library of programming interfaces may be configured to specify one or more of a call-sign and at least one command. Furthermore, each of the call-sign and the at least one command may be specified in textual form.

Additionally, the method 100 may include a step 104 of training a speech recognizer based on one or more of the call-sign and the at least one command. Details regarding training of the speech recognizer is described in conjunction with FIG. 2.

Further, the method 100 may include a step 106 of recognizing a speech input including a vocal representation of one or more of the call-sign and the at least one command. Furthermore, the recognition may be performed by using the speech recognizer. Accordingly, in some embodiments, the method 100 may further may include receiving each of the call-sign and the at least one command over a hardware communication interface. Further, in some embodiments, the hardware communication interface may include a serial interface.

Further, the method 100 may include a step 108 of performing at least one action associated with the at least one command based on recognizing the speech input. Furthermore, the at least one action may include providing a verbal response using an integrated speech synthesizer.

Figure 2:
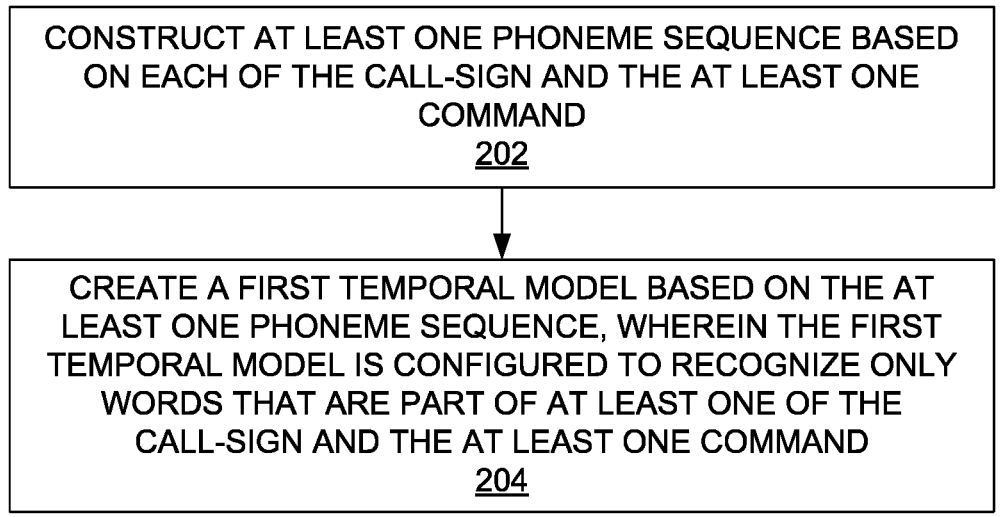
FIG. 2 illustrates a flow chart of steps involved in training a speech recognizer for facilitating construction of a voice dialog interface for an electronic system, according to some embodiments.

FIG. 2 illustrates a flow chart of steps involved in performing training of the speech recognizer, in accordance with some embodiments. In some embodiments, the training may include a step 202 of constructing at least one phoneme sequence based on each of the call-sign and the at least one command. Additionally, the training may include a step 204 of creating a first temporal model based on the at least one phoneme sequence. Further, the first temporal model may be configured to recognize only words that may be part of one or more of the call-sign and the at least one command.

In some embodiments, each of the call-sign and the at least one command may include at least one word. In some embodiments, each of the call-sign and the at least one command may include a plurality of words. Further, a temporal alignment of the plurality of words may be prioritized during recognition.

In some embodiments, the training may further include a step of creating a second temporal model based on the at least one phoneme sequence. Further, the second temporal model may be configured to assign higher probabilities to word sequences that may be part of the at least one command.

In some embodiments, the training may further may include a step of receiving a training mode indicator. Further, the training may be performed based on one of individual words comprised in the at least one command according to the training mode indicator.

In some embodiments, training the speech recognizer may be further based on pre-recorded speech models and a phonetic dictionary to allow for speaker-independent training of the speech recognizer based only on textual form of at least one the call-sign and the at least one command.

Figure 3:
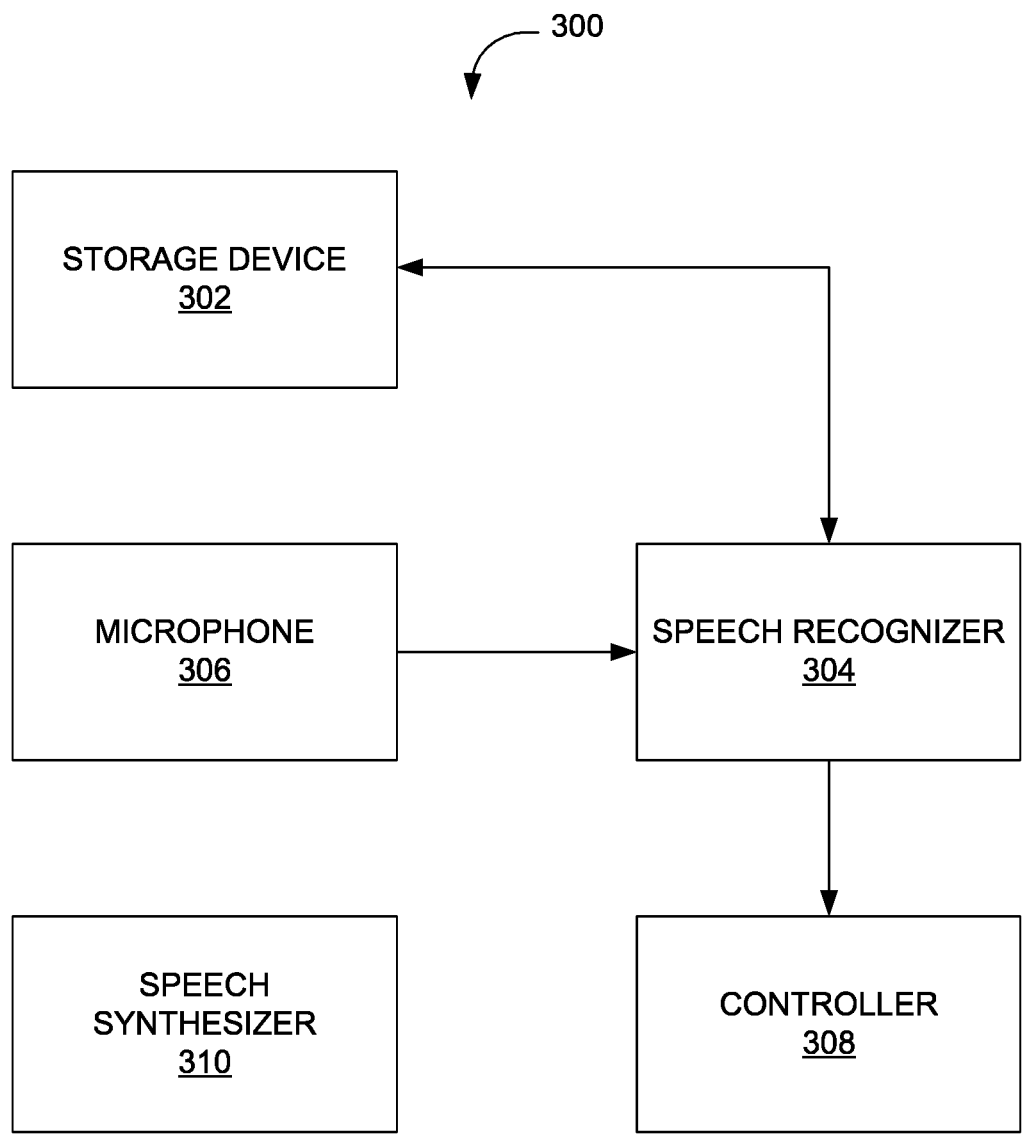
FIG. 3 illustrates a block diagram of an electronic system configured for facilitating construction of a voice dialog interface, according to some embodiments.

FIG. 3 illustrates a block diagram of an electronic system 300 configured for facilitating construction of the voice dialog interface. The electronic system 300 may include a storage device 302 configured to store the library of programming interfaces for constructing the voice dialog interface. Further, the library of programming interfaces may be configured to specify one or more of the call-sign and the at least one command. Further, each of the call-sign and the at least one command may be specified in textual form. Further, the electronic system 300 may include a speech recognizer 304 configured for training based on one or more of the call-sign and the at least one command. Further, the electronic system 300 may include a microphone 306 configured for receiving the speech input including the vocal representation of one or more of the call-sign and the at least one command. Further, recognition of the speech input may be performed by using the speech recognizer 304. Further, the electronic system 300 may include a speech synthesizer 310 configured for providing a verbal response. Further, the electronic system 300 may include a controller 308 configured for performing the at least one action associated with the at least one command based on recognizing the speech input. Further, the at least one action may include the verbal response.

Figure 4:
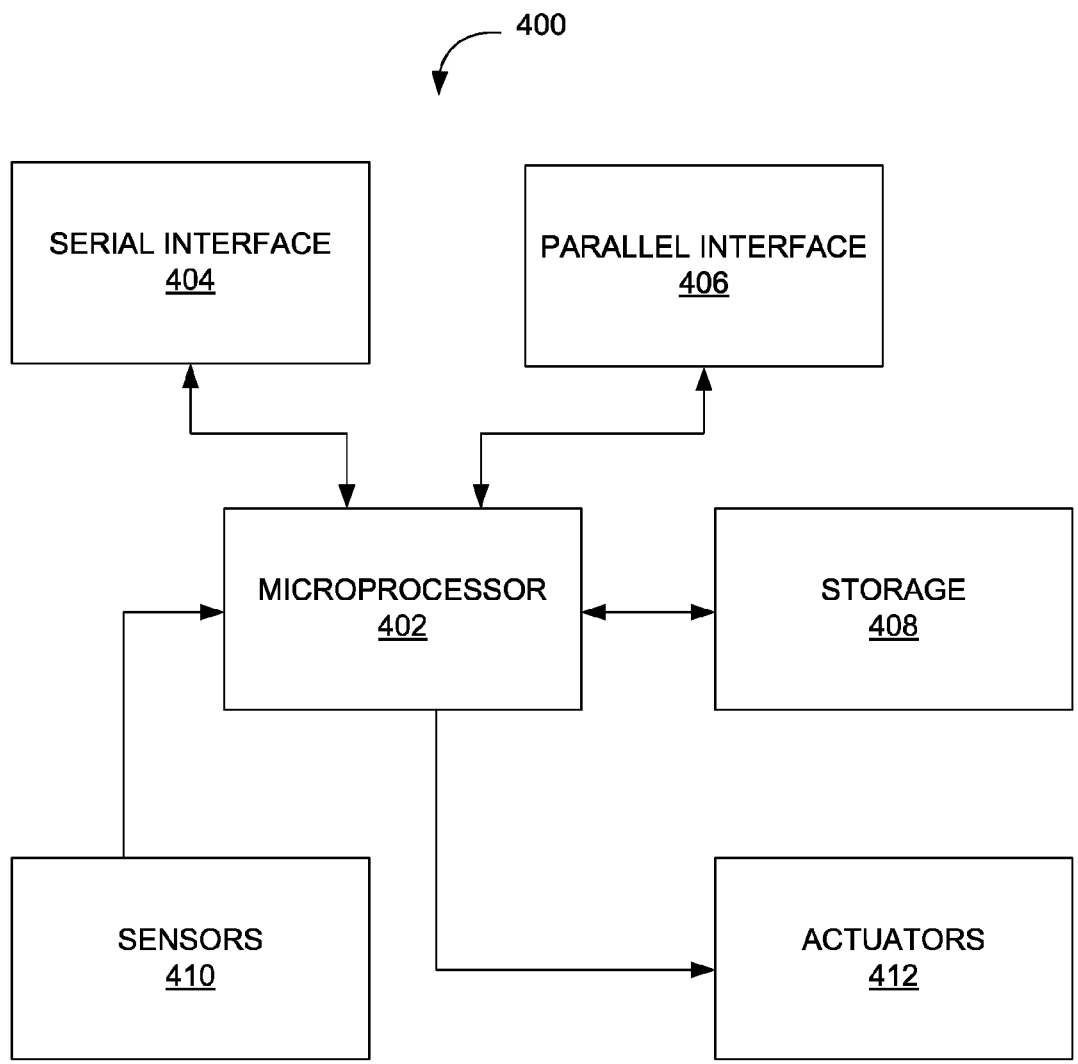
FIG. 4 illustrates a block diagram of an electronic system comprising sensors and/or actuators and configured for facilitating construction of a voice dialog interface, according to an exemplary embodiment.

FIG. 4 illustrates a block diagram of an electronic system 400 configured for facilitating construction of a voice dialog interface, in accordance with some embodiments. The electronic system 400 may include an electronic circuit development board, also commonly called as electronic prototyping board or kit. For example, the electronic system 400 may include an Arduino-compatible circuit development board. Accordingly, in some embodiments, the electronic system 400 may include at least one physical interface configured to removably attach one or more components such as, but not limited to, of an input device, an output device, a sensor, an actuator and a microprocessor to the electronic development board.

Figure 1:
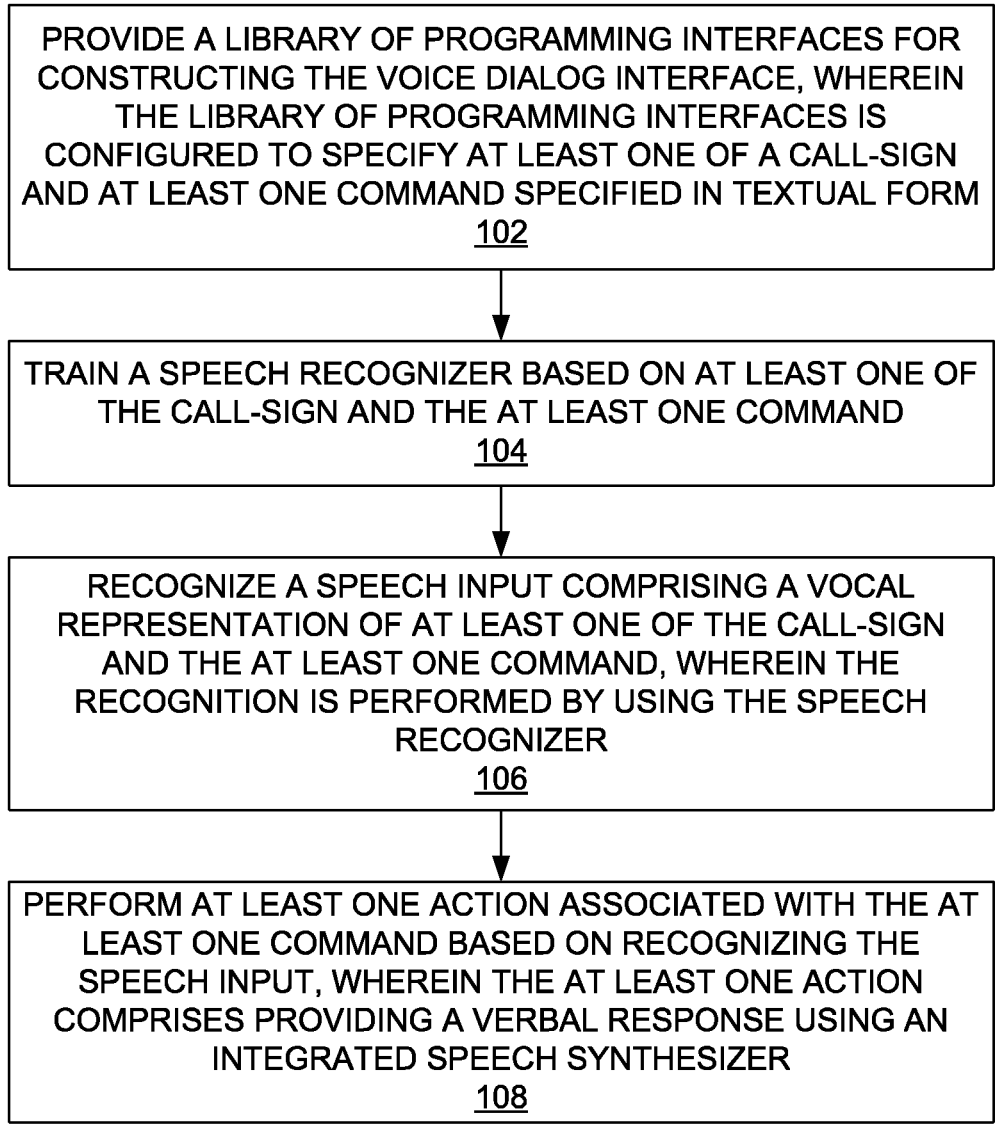
FIG. 1 illustrates a flow chart of a method of facilitating construction of a voice dialog interface for an electronic system, according to some embodiments.

For instance, as shown, the electronic system 400 may include a microprocessor 402, a serial interface 404, a parallel interface 406, a storage 408, sensors 410 and actuators 412. Further, the storage 408 may be configured to store the library of programming interfaces for constructing the voice dialog interface. Further, the library of programming interfaces may be configured to specify one or more of the call-sign and the at least one command. Further, each of the call-sign and the at least one command may be specified in textual form. Accordingly, one or more of the serial interface 404 and the parallel interface 406 may be configured to receive the call-sign and the at least one command through an input device such as, for example, a keyboard attachable to the electronic system 400. Additionally, in some embodiments, the storage 408 may also be configured to store program code executable by the microprocessor 402. For instance, execution of the program code may cause the microprocessor 402 to read data from one or more of the serial interface 404, the parallel interface 406, the storage 408, sensors 410. Further, execution of the program code may also cause the microprocessor 402 to write data to one or more of the serial interface 404, the parallel interface 406, the storage 408 and the actuators 412. Further, writing of the data may be based on reading of the data and in accordance with the program code. As a result, the electronic system 400 may allow a user to construct a variety of hardware configurations and operations based on the program code and removably attachable components. Further, the microprocessor 402 may also be configured to implement, in conjunction with the storage 408, each of the speech recognizer, the speech synthesizer and the controller as described in relation to FIG. 1 and FIG. 2. As a result, a user may be able to conveniently construct the voice dialog interface including speech recognition and speech synthesis for operating the electronic system 400.

Exemplary Embodiment

According to an exemplary embodiment, the method 100 of facilitating construction of the voice dialog interface abstracts the complexity of speech recognition and simplifies the tasks of programming and training a speech-based personal assistant to the skill level of a beginner programmer.

Accordingly, the speech recognizer according to the method 100, such as for example, speech recognizer 304 is characterized by two basic modes of operation: training and recognition.

In the training mode, training sentences in textual form are sent over a serial connection to a shield. The shield phonetizes words in each sentence using an English dictionary that includes phonetization and spelling rules and approximates even for proper names. The phoneme sequences are used to create a first temporal model that makes sure that only those words are recognized which have been part of the training sentences. A second temporal model favors word sequences that are part of the sentences over sequences that are not by assigning higher probabilities to phoneme sequences that occurred in the trained sentences over those that didn't.

In the recognition mode, an incoming speech input received from the microphone is broken down into speech regions and non-speech regions. This may be done, for example, by an algorithm that monitors the energy of a signal corresponding to the incoming speech input over a short time period and compares the energy to a threshold. If the pattern of the energy looks like speech and speech pauses, the signal is determined to be speech, otherwise the signal is ignored. The speech regions of the signal are then passed to a classifier that has been trained on hundreds of adult speakers. Accordingly, the incoming speech input is broken down into possible phonemes sequences. Using the temporal model created during training, the phoneme sequences are matched to the pre-trained words. Further, during the matching, word sequences that are part of the training sentences are favored. Optionally, a last correction step maps the words to the most likely sentence in the training set.

The following describes functions that may be provided in the library of programming interfaces (an instance of which is also referred to, herein, as MOVI) for facilitating construction of the voice dialog for the electronic system, such as for example, an Arduino electronic development board (also referred to herein as Arduino). The functions in the library are divided into several categories, depending on when they can be called in the Arduino execution process and also their potential frequency of use.

The Arduino execution process is divided into setup ( ) and loop ( ).

Functions that must be used in setup ( ) MOVI constructors:

MOVI ( ) Construct a MOVI object with default configuration.

MOVI (bool debug on off) Construct a MOVI object with optional Serial Console interaction.

MOVI (bool debug on off, int rx, int tx) Construct a MOVI object with different communication pins and optional Serial Console interaction. This constructor works on AVR architecture CPU. Other architectures may ignore the rx and tx parameters and use whatever pins are designated to Serial.

Initialization functions:

init( ) This init function waits for MOVI to be booted and resets some settings. If the speech recognizer had been stopped with stopDialog( ), it is restarted.

init(bool waitformovi) This init function only initializes the API and doesn't wait for MOVI to be ready if the parameter is false.

bool isReady( ) This function can be used to determine if MOVI is ready to receive commands, e.g. when MOVI has been initialized with init(false).

bool addSentence(String sentence) This function adds a sentence to the training set. Sentences must not contain any punctuation or numbers. Everything must be spelled out. No special characters, umlauts or accents. Uppercase or lowercase does not matter.

bool train( ) This function checks if the training set contains new sentences since the last training. If so, it trains all sentences added in this MOVI instance. Once training is performed, no more sentences can be added and training cannot be invoked again in the same instance.

callSign(String callsign) This function sets the callsign to the parameter given. If the callsign has previously been set to the same value, nothing happens. Only one call-sign can be trained per MOVI instance and callsign must be one word and cannot contain any special characters or numbers. The callsign can be an empty string. However, in this case, MOVI will react to any noise above the threshold (clapper mode).

Functions that are typically used in setup( ) but can also be used in loop( ):

setVolume(int volume) Sets the output volume for the speaker port. The value for volume is expected to be between 0 (mute) and 100 (full). The default is 100. Values between 0 and 100 may be set to approximated values due to internal technical details of the sound card. For example, setVolume(20) may result in a volume of 16.

setVoiceGender(bool female) This function sets the gender of the speech synthesizer. True being female. False being male.

setThreshold(int threshold) Sets the noise threshold of the speech recognizer. Values vary between 2 and 95. Factory default is 5. Depending on the noise of the environment, MOVI may have difficulty distinguishing between noise and speech and may wait very long for a sentence to end. Increasing the noise threshold may help. Typically, a value of 15 is good for somewhat noisy environments and a value of 30 for very noisy environments. Ultimately, experimentation is the only way to determine a good noise threshold.

responses(bool on) Turns the spoken responses as a result of recognition events (e.g. silence or noise) on or off.

welcomeMessage(bool on) Turns off the spoken welcome message indicating the call-sign.

beeps(bool on) Turns the recognition beeps on or off.

Functions that are typically used in loop( )

signed int poll( ) This function is the most important function. It is called in loop( ) to get an event from the recognizer. 0 stands for no event. A positive number denotes a sentence number. A negative value defines an event number. Event numbers are the negatives of the numbers displayed on the serial monitor. For example: MOVIEvent [200] would return −200.

String getResult( ) Gets the result string of an event. For example: MOVIEvent[201]: LET THERE LIGHT results in "LET THERE BE LIGHT\n". The resulting string might need trimming for comparison to other strings. The resulting string is uppercase and does not contain any numbers, punctuation or special characters.

say(String sentence) Uses the internal synthesizer to make MOVI speak the sentence given as parameter using the speech synthesizer.

ask(String question) This function instructs MOVI to speak the sentence given as first parameter using the synthesizer and then directly listen without requiring a callsign.

password(String question, String passkey) Similar to ask, this functions makes MOVI speak the sentence given as first parameter using the speech synthesizer. Then MOVI's password function is used to query for a password. The API compares the passkey with the password and returns either PASSWORD_REJECT or PASSWORD_ACCEPT as an event. The passkey is not transferred to or saved on the MOVI board. While all password attempts are passed over the serial communication, the only board that knows the right answer is the Arduino. It compares the password attempts and sends the appropriate event. The passkey must consist only of words contained in the trained sentences and must not contain digits or other non-letter characters except one space between the words.

Infrequently Used Advanced Commands sendCommand(String command, String parameter) Sends a command manually to MOVI. This allows to send any command to MOVI that is defined in the low level interface.

float getFirmwareVersion( ) Returns MOVI's firmware version.

float getHardwareVersion( ) Returns MOVI's board revision.

float getAPIVersion( ) Returns the version of the library.

stopDialog( ) Stops the speech recognizer and the speech synthesizer without powering down the MOVI hardware.

restartDialog( ) Restarts the speech recognizer and the speech synthesizer manually (e.g. after a stopDialog).

factoryDefault( ) Resets MOVI to factory default. This function should only be used in setup( ) and only if needed. All trained sentences and callsigns are untrained. The preferable function for a factory reset is to use the serial monitor or a long press on the MOVI's reset button.

~MOVI( ) Destructs the MOVI object.

The Low Level Interface The MOVIShield library is an easier way to program MOVI, especially when used by modifying the examples that come with it. However, in order to have access to the full functionality of the board, including some useful debugging features, it will be necessary to use the low level interface from time to time. The low level interface is accessible through the Serial Console of the Arduino IDE when a MOVI object is constructed using the value true for the debug parameter.

Low level commands are all uppercase and the responses are MOVIEvents. Most of the commands are self descriptive.

Note: When using the USB host capabilities of the Arduino Leonardo, invoking the Serial Console may take some extra seconds as the board needs to reconfigure its serial interface. To see Serial Console messages on the Due connect the "Programming" USB to your computer while in the Arduino IDE.

HELP Shows the list and usage of the manually-usable low-level commands.

SAY <sentence> Speak the sentence through the synthesizer. Sentences can include numbers and punctuation. Corresponds to the function of the same name in the API.

SHUTDOWN Shuts the underlying Linux system on the shield down.

ABOUT Returns copyright messages as shield event.

VERSION Returns the version of this software.

HWVERSION Returns the version of board circuit.

PING Returns "PONG" as a shield event (or not, if the shield is not properly working)

VOLUME <percentage> Sets the output volume between 0-100 and returns the new volume as shield event. Corresponds to the function in the API.

STOP Disables all recognition and ignores all SAY commands until "RESTART". Corresponds to stopDialog( ) in the API.

RESTART Can be used anytime to reset the speech recognition and the speech synthesizer. No retraining is performed. Corresponds to restartDialog( ) in the API.

FACTORY Reset the shield to factory settings. Trained vocabulary, call-signs and settings are reset as well. Corresponds to the API function as well as the long-press of the reset button.

ASK Perform a single recognition cycle without call-sign.

PASSWORD Perform a single recognition cycle without call-sign. DO NOT correct the raw results.

FEMALE Switch the synthesizer to female voice

MALE Switch the synthesizer to male voice (default)

VOCABULARY Output the trained sentences to the serial console

CALLSIGN [<word>] Change the call-sign to a new word. If the word is empty, any sound activity will trigger a recognition cycle.

TRAIN Manually train the recognizer to recognize the sentences. System will prompt. Sentences are separated by \n and end with '#'. '@' aborts. This function is inherently not thread safe and should only be used manually. This command is intended to be used for debugging and to save memory when training a large set of sentences.

SYSTEMMESSAGES <"ON"|"OFF"> Toggle synthesizer messages like "System is being shutdown" or "System is booting". There is no corresponding API function as this function will not reset with a new MOVI object.

RESPONSES <"ON"|"OFF"> Toggle synthesizer responses like "I did not understand you". Corresponds to the API function.

BEEPS <"ON"|"OFF"> Toggle recognition cycle beeps. Corresponds to the API function.

WELCOMEMESSAGE <"ON"|"OFF"> Toggle synthesized welcome message and call-sign. Corresponds to the API function.

THRESHOLD <percentage> Set the sound activity threshold. Valid percentages are between 2 and 95. Factory default is 5. This function exactly corresponds with the API function. See description there for further explanation.

MICDEBUG <"ON"|"OFF"> Toggles microphone debug mode. RESTART required for change to take effect. In this mode all microphone activity above threshold is echoed. This functions is very valuable for debugging environmental noise or other microphone issues, especially in connection with THRESHOLD.

MEM Display memory usage. Useful for debugging potential memory overflows in extensive training scenarios with hundreds of sentences.

INIT This function is used in the MOVI API when a new MOVI object is instantiated. It resets certain settings and restarts the recognizer if stopped. It returns shield event 101 containing versioning information.

NEWSENTENCES This command is used in the MOVI API to declare a new set of to-be-trained sentences.

ADDSENTENCE <sentence> This command is used in the MOVI API to add a sentence to the current set of to-be-trained sentences.

TRAINSENTENCES This command is used in the MOVI API to invoke training the set of to-be-trained sentences. This command does nothing if the set of trained sentences and the set of to-be-trained sentences are equal.

MOVI Event Categories

MOVI returns events over the serial communication line with 9600 bps as a result of either the execution of a command or extrinsic or intrinsic board events (e.g. shutdown or callsign detected).

The format of the events is MOVIEvent[<eventno>]: <textual description>

The textual description is user readable and can change with version to version. The eventno is meant to be interpreted by the machine. poll( ) will return 0 for no event, a positive number when a sentence was recognized and -eventno for an event.

The events itself are grouped into the following categories Events in the 0-99 range are to be ignored by the library or programs using MOVI as they constitute debugging output readable only to the user Event 100 is pong Events 101-110 are defined for versioning checks of the device. Events 111-199 are defined for other status messages. Event 200 is callsign detected. Events in the 201-299 are responses to commands. Events in the 400 range denote errors. Events in the 500 range denote non-speech states.

The most frequently used events are defined with #define macros in the MOVI library for easy use with the poll( ) command. These are:

0 (SHIELD_IDLE) Not an actual MOVI event, returned by poll( ) when nothing happened.

140 (BEGIN_LISTEN) MOVI starts to listen (after call-sign)

141 (END_LISTEN) MOVI stops listening (after timeout or as per energy detector)

150 (BEGIN_SAY) MOVI starts speaking in the synthesizer 151 (END_SAY) MOVI stops speaking 200 (CALLSIGN_DETECTED) Call sign was detected 201 (RAW_WORDS) This event contains the raw words (to be returned with getResult( ))

204 (PASSWORD_ACCEPT) Password accepted (generated by library after password( ) call)

404 (PASSWORD_REJECT) Password rejected (generated by library after password( ) call) 530 (NOISE_ALARM) Too much noise 501 (SILENCE) Empty sentence (silence or noise).

502 (UNKNOWN_SENTENCE) Unmatchable result. This happens when two or more trained sentences could equally by matched to the recognition result.

Example Use Case

The following abbreviated C++ code snippet implements a speech-driven light switch.

```
MOVI recognizer(true); // Get a MOVI object
void setup()
{
recognizer.init(); // Initialize MOVI (waits for it to boot)
recognizer.callSign("MOVI"); // train call-sign
recognizer.addSentence("Let there be light"); // Add sentence 1
recognizer.addSentence("Go dark"); // Add sentence 2
recognizer.train(); // Train
}
void loop () {
signed int res=recognizer.poll(); // Get result
if (res==1) // Sentence 1
{
// light on
}
if (res==2) // Sentence 2
{
// light off
}
}
```

While, simple to use, the API as defined above allows for a variety of usages and programming modes of a speech recognizer. The power of the API is derived from it's matrix scheme: Words in a row are treated as a temporally dependent sequence. Words in columns are independent.

The following describes how this scheme is best used for different examples. Let assume one wants to recognize any combination of numbers between one and three. Is it better to train one sentence "one two three" or three 'sentences' "one", "two", and "three"? If the goal is to recognize any combination of the numbers one, two and three and each of them are equally likely to appear, it's best to train three sentences and use the getResult( ) function. Training one sentences will work too but there is a high likelihood that the recognizer will favor "one two three".

If it's really always a combination of three different numbers between one and three, it is preferable to train all six combinations of "one two three", "one three two", "two three one", "three two one", "two one three", "three one two". This way, poll( ) can be used and MOVI's algorithm can correct errors.

What if the combination of numbers was between 1 and 10? Training 10!=3628800 sentences will not work with any recognizer. So obviously 10 sentences need to be trained and getResult( ) needs to be used.

What if only one number between one and ten was to be recognized? In this, case it is fine to train one sentence of ("one two three four five six seven eight nine ten") since it saves memory and training speed and the temporality isn't used anyways as there is only one word to be recognized. However, training ten sentences will not harm the recognition accuracy.

What it there was some known word sequencing but not for the entire sentence? Let's say you want to recognize '0.x' and '1.x' with x being a number between 0 and 9. The best way to do this is to train twenty sentences "zero point zero", "zero point one", "zero point two", . . . "one point nine". However, if the acoustic conditions in the room are good, it's feasible to break the sequences up into less sentences, for example: "zero point", "one point", and 8 single word sentences "two", "three", "four", etc. . . . (the words zero and one have already been trained). This may be further reduced to three sentences by making the numbers 2-9 one sentence "two three four five six seven eight nine ten". Splitting up this task in less than twenty sentences, however, requires to use the getResult( ) function.

The overall rule of thumb is: Favor training all known word sequences as sentences. Otherwise, train words as sentences individually.

Sentences do not get higher priority if they are defined twice as, in fact, the system will remove duplicate sentences. However, if one can give a certain sequence (out of many possible) a higher priority by first defining individual word sentences and then the actual sequence. For example, defining the sentence "one", "two", "three" and the sentences "three two one" will give a higher probability to the sequence "three two one" than any other sequence. This does play a role in noisy room conditions.

If you want to create a keyword spotter, e.g. recognize a particular word out of many, it's best to train a lot of other words as well. For example, if you want to recognize whenever the word "Simon" appears in a sentence, you would train the word "simon" as a sentence along with a set of other words, for example words that appear very frequently in English such as "the", "be", "to", "off", (for a more comprehensive list checkout this link: https://en.wikipedia.org/wiki/Most_common_words_in_English) as well as words that are similar to Simon (e.g, "assignment"). This way, these words are recognized and it lowers the false alarm rate of MOVI detecting "Simon" when other words are spoken.

Please also note that for sentence matching (as part of the poll( ) function) it is best for all trained sentences to have about equal length. A single very long sentence will always be favored when a lot of words are spoken.

Moreover, this allows the training of number ranges, by training a sentence like "dim [0-100] percent". Internally, a new sentence is generated that creates the numbers "one two three four" up to "one hundred".

Although the invention has been explained in relation to its preferred embodiment, it is to be understood that many other possible modifications and variations can be made without departing from the spirit and scope of the invention as hereinafter claimed.

The following is claimed:

1. A method of facilitating construction of a voice dialog interface comprising:
   providing an electronic system, the electronic system comprising a storage device, a speech recognizer, a microphone, a speech synthesizer, a controller and an electronic development board, the electronic development board comprising a so-called Arduino-compatible circuit development board;
   storing a library of programming interfaces for constructing the voice dialog interface in the storage device, the library of programming interfaces being configured to specify at least one of a call-sign and at least one command, each of the call-sign and the at least one command being specified in textual form, each of the call-sign and the at least one command comprising a plurality of words;
   training the speech recognizer based on at least one of the call-sign and the at least one command;
   receiving, by the microphone, a speech input comprising a vocal representation of at least one of the call-sign and the at least one command, recognition of the speech input being performed by using the speech recognizer, a temporal alignment of the plurality of words being prioritized during the recognition; and
   performing, by the controller, at least one action associated with the at least one command based on recognizing the speech input, the at least one action comprising a verbal response provided by the speech synthesizer.

2. The method of claim 1, wherein the electronic development board comprises at least one physical interface configured to removably attach at least one of an input device, an output device and a processor to the electronic development board.

3. The method of claim 2, wherein the input device comprises at least one sensor, wherein the output device comprises at least one actuator.

4. The method of claim 1, wherein the training comprising:
   constructing at least one phoneme sequence based on each of the call-sign and the at least one command; and
   creating a first temporal model based on the at least one phoneme sequence, wherein the first temporal model is configured to recognize only words that are part of at least one of the call-sign and the at least one command.

5. The method of claim 4 comprising creating a second temporal model based on the at least one phoneme sequence, wherein the second temporal model is configured to assign higher probabilities to word sequences that are part of the at least one command.

6. The method of claim 1 comprising receiving a training mode indicator, wherein the training is performed based on one of individual words comprised in the at least one command and sentences comprised in the at least one command according to the training mode indicator.

7. The method in claim 1, wherein training the speech recognizer is based on pre-recorded speech models and a phonetic dictionary to allow for speaker-independent training of the speech recognizer based only on textual form of at least one the call-sign and the at least one command.

8. An electronic system configured for facilitating construction of a voice dialog interface comprising:
   a storage device configured to store a library of programming interfaces for constructing the voice dialog interface, the library of programming interfaces being configured to specify at least one of a call-sign and at least one command, each of the call-sign and the at least one command being specified in textual form, each of the call-sign and the at least one command comprising a plurality of words;
   a speech recognizer configured for training based on at least one of the call-sign and the at least one command;
   a microphone configured for receiving a speech input comprising a vocal representation of at least one of the call-sign and the at least one command, recognition of the speech input being performed by using the speech recognizer, a temporal alignment of the plurality of words being prioritized during the recognition;
   a speech synthesizer configured for providing a verbal response;
   a controller configured for performing at least one action associated with the at least one command based on recognizing the speech input, the at least one action comprising the verbal response; and an electronic development board, the electronic development board comprising a so-called Arduino-compatible circuit development board.

9. The electronic system of claim 8, wherein the training comprising:

constructing at least one phoneme sequence based on each of the call-sign and the at least one command; and creating a first temporal model based on the at least one phoneme sequence, wherein the first temporal model is configured to recognize only words that are part of at least one of the call-sign and the at least one command.

10. The electronic system of claim 9, wherein the training comprises creating a second temporal model based on the at least one phoneme sequence, wherein the second temporal model is configured to assign higher probabilities to word sequences that are part of the at least one command.

11. The electronic system of claim 10, wherein the training comprises receiving a training mode indicator, wherein the training is performed based on one of individual words comprised in the at least one command and sentences comprised in the at least one command according to the training mode indicator.

12. The electronic system of claim 8, wherein training of the speech recognizer is based on pre-recorded speech models and a phonetic dictionary to allow for speaker-independent training of the speech recognizer based only on textual form of at least one the call-sign and the at least one command.

* * * * *